(12) United States Patent
Mandic

(10) Patent No.: US 6,367,828 B1
(45) Date of Patent: Apr. 9, 2002

(54) RECREATIONAL BOARD VEHICLE

(76) Inventor: Les Mandic, 4920 Mira Sol Dr., Moorpark, CA (US) 93021

( * ) Notice: Subject to any disclaimer, the term of this patent is extended or adjusted under 35 U.S.C. 154(b) by 0 days.

(21) Appl. No.: 09/544,570

(22) Filed: Apr. 6, 2000

(51) Int. Cl.⁷ .............................................. B62M 1/00
(52) U.S. Cl. ................................................. 280/87.05
(58) Field of Search ........................ 280/87.01, 87.021, 280/87.041, 87.042, 87.043, 87.05, 14.27, 14.28; 188/5, 23

(56) References Cited

U.S. PATENT DOCUMENTS

| 1,056,357 A | | 3/1913 | Murdock |
| 1,150,773 A | | 8/1915 | La Chall |
| 1,213,454 A | | 1/1917 | Brown |
| 1,244,169 A | | 10/1917 | Brigel |
| 1,387,675 A | | 8/1921 | Worobow |
| 1,395,497 A | * | 11/1921 | Huseman ............... 280/87.041 |
| 1,530,165 A | | 3/1925 | Fowler |
| 1,900,108 A | * | 3/1933 | Hedeen et al. ......... 280/87.021 |
| 1,951,277 A | * | 3/1934 | Elliote .................... 280/87.041 |
| 2,330,147 A | | 9/1943 | Rodriguez |
| 2,965,387 A | * | 12/1960 | Brunzell ................... 280/87.01 |
| 3,288,251 A | | 11/1966 | Sakwa |
| D218,628 S | | 9/1970 | Gonzalez |
| 3,751,062 A | | 8/1973 | White, Sr. |
| 3,945,655 A | | 3/1976 | Banks et al. |
| 4,040,639 A | | 8/1977 | Scardenzan |
| 4,043,566 A | * | 8/1977 | Johnson .................. 280/87.042 |
| 4,054,296 A | | 10/1977 | Sullins |
| 4,061,351 A | | 12/1977 | Bangle |
| 4,093,252 A | | 6/1978 | Rue |
| 4,095,817 A | | 6/1978 | Cohen |
| 4,099,734 A | * | 7/1978 | Lowery .................. 280/87.042 |
| 4,167,225 A | * | 9/1979 | Fragoso .................. 280/87.042 |
| 4,179,134 A | | 12/1979 | Atkinson |
| 4,445,699 A | * | 5/1984 | Darasko ................. 280/87.041 |
| 4,707,884 A | | 11/1987 | Chang |
| 4,732,400 A | | 3/1988 | Santini |
| 4,811,971 A | | 3/1989 | Phillips |
| 4,886,297 A | | 12/1989 | Levine |
| 5,090,716 A | | 2/1992 | Borden |
| 5,622,759 A | * | 4/1997 | Fuster .................... 280/87.041 |
| 6,035,976 A | * | 3/2000 | Duhamel ............... 280/87.042 |

FOREIGN PATENT DOCUMENTS

| DE | 3138095 | * | 4/1983 | ............ 280/87.041 |
| GB | 616723 | * | 1/1949 | ............ 280/87.041 |

* cited by examiner

Primary Examiner—Frank Vanaman
(74) Attorney, Agent, or Firm—Fulwider Patton Lee & Utecht, LLP

(57) ABSTRACT

A recreational board vehicle includes an elongated board having front and rear wheel truck assemblies attached thereto, a base assembly to which is mounted a handlebar assembly and brake assembly. The brake assembly includes a foot pedal and brake pad which allows the rider to press the foot pedal to cause the brake pad to come in frictional contact with the ground to stop the vehicle. The base assembly provides a mounting base which allows the handlebar assembly to move between an upright position for steering purposes and a collapsed position for storage purposes.

15 Claims, 5 Drawing Sheets

RECREATIONAL BOARD VEHICLE

BACKGROUND OF THE INVENTION

The present invention relates generally to skateboards and scooters and, more particularly, to a novel system for mounting a collapsible handlebar assembly and integrated brake assembly to a vehicle's chassis to provide an easily operable and controllable recreational board vehicle having braking capabilities that achieve quick and stable stopping without causing significant loss of balance or control of the vehicle on the part of the rider.

Skateboards have been very popular for a number of years and generally include an elongated board or platform having a set of wheels mounted at opposite ends. Normally, the rider of a skateboard stands on the platform with one foot and propels himself with the other while maintaining proper balance to avoid falling from the skateboard. A rider can guide the skateboard in different directions and perform a number of maneuvers by properly shifting body weight or foot placement on the board. Generally, a considerable amount of skill is needed to properly ride a skateboard as the rider must maintain proper balance while controlling the speed and direction of the board. Since skateboarders can achieve considerable speeds, there is an increased need for the rider to properly control and stop the board, when necessary, to avoid collisions with other skateboarders, vehicles or stationary structures.

Prior to the advent of skateboards, scooters were a one-time popular riding vehicle, somewhat similar to a skateboard, but also including a control handle or handle bars rigidly secured to an upright post mounted to the scooter's chassis. For beginners, a control handle is particularly useful since it provides the rider with a structure that can be grasped while riding to assist in balancing and controlling the vehicle. The scooter rider, like the skateboarder, must be able to balance and control the vehicle to avoid hitting objects while performing maneuvers and must be able to stop at a moment's notice, if necessary, to avoid striking objects. Serious injuries can result if excessive speeds are reached and the rider is thrown from the scooter or if the rider is unable to properly control the scooter in dangerous environments, such as automobile traffic.

For these reasons, a number of skateboards and scooters have been developed to assist the rider in maneuvering and controlling the vehicle and to help stop the vehicle as may be needed. For example, U.S. Pat. No. 4,093,252 shows a scooter-type vehicle including a board and a handle which extends from the board that can be grasped by the rider for balancing and controlling the vehicle in a satisfactory manner. U.S. Pat. No. 4,707,884 is illustrative of a foldable handle which can be placed directly on a skateboard to allow beginners and younger children to balance and maneuver the skateboard as needed. Another example of a skateboard with a handle includes U.S. Pat. No. 4,886,297 which discloses a handlebar which can be quickly connected or disconnected to a skateboard.

Other vehicles which utilize a handle to guide the skateboard and further include a braking system for stopping the skateboard are shown in U.S. Pat. No. 4,179,134 which discloses a training handle and brake that can be removable attached to a skateboard. This particular skateboard utilizes a braking system which can be actuated by the user to cause a brake shoe to engage the front wheels of the skateboard to slow down and eventually stop the vehicle. Other vehicles utilizing an upright handle for maneuvering and steering purposes and include a braking system are U.S. Pat. No. 1,530,165 which discloses a vehicle with a foot pedal that can be actuated to stop the vehicle and U.S. Pat. No. 4,040,639 which discloses a skateboard having a braking device at the rear end of the board that allows the operator to tilt the entire skateboard backward to bring the braking device in frictional contact with the ground to slow down and eventually stop the vehicle.

Other devices using a braking system with a stand-alone skateboard include U.S. Pat. No. 4,054,296 which discloses a braking system located at the rear of the skateboard that allows the rider to step on a foot pedal to bring a braking block in contact with the ground and U.S. Pat. No. 3,288,251 which discloses a skateboard brake that allows the rider to press down on a foot pedal to actuate a braking shoe against the rear wheels of the skateboard.

While the above-identified prior art scooters and skateboards may provide some measure of a braking system, along with a balancing apparatus for the rider, the location of the braking assembly may actually cause the front end of the vehicle to tip upward, resulting in a wheelie, which can cause the rider to experience a temporary loss of control of the vehicle and possibly cause a spill. For example, when scooters or skateboards utilize handlebars or a control handles to aid the rider in steering the device, if the brake component is placed at the rear of the board, the user may have to shift his weight back to the rear of the scooter in order to actuate the brake. This could cause the wheelie affect to occur or at least partial loss of control which would be detrimental especially when a rider is attempting to perform a specific maneuver. Additionally, if the braking system is placed too far forward on the vehicle, in front of the center of mass of the rider, it is also possible for the brake to thrust the rider forward as the brake is being applied. Again, such an occurrence would be detrimental when riding at top speeds or when the rider is attempting to perform particular maneuvers.

Thus, what is needed is a recreational board vehicle which allows the rider to accomplish braking primarily through foot pressure on a braking system to achieve a smooth and continuous braking action. The braking system should be placed on the vehicle such that unnecessary forces which can either pull the front edge of the board forward or throw the rider forward are alleviated. Additionally, the combination of a skateboard, handlebar system and braking system should create a vehicle which is easy for the rider to control and will provide satisfactory braking action even at high speeds. The present invention satisfies these and other needs.

SUMMARY OF THE INVENTION

The present invention provides a recreational board vehicle which utilizes a unique design which assists the rider in balancing and controlling the vehicle while providing a braking system that allows for smooth stopping of the vehicle even at high speeds. The present invention enables the user to apply a braking force to stop the vehicle without creating a rearward or forward rocking motion which could possibly toss the rider off the vehicle or cause the rider to lose at least temporary control of the vehicle.

The present invention includes an elongated board for supporting the rider, the board having a forward section and rear section. Wheel truck assemblies are mounted to the underside of the elongated board both at the rear section and forward section of the board. A unique base assembly is mounted to the elongated board at the forward section and is attached to both a braking assembly for stopping the board vehicle and a handlebar assembly which projects upward away from the board to aid the user in balancing and controlling the board vehicle. The braking assembly is directly mounted to the base assembly, which is also attached to the handlebar assembly, to achieve a sufficient amount of braking force to create a smooth stop when actuated. Also, since the braking system is located substantially near the center of mass of the rider standing on the board, there is less likelihood that the braking action will throw the rider off the vehicle and will allow the rider to effectively control and maneuver the board when performing maneuvers. The base assembly can include a base mounting shaft which is movable between an upright position and a collapsed position. This allows the handlebar assembly of the vehicle to be collapsed to a convenient size for storage purposes.

In one embodiment, the recreational board is shaped as a surfboard and is made from wood to provide a thicker and more rigid platform than most traditional skateboards. This construction also may allow the rider to achieve higher speeds than traditional scooters or skateboards but does not diminish the control and braking ability supplied by the braking system of the present invention. Additionally, the handlebars can be adjusted to varying heights above the board to adjust for different heights of the rider utilizing the vehicle. The handlebar assembly can also be moved between an upright position to a folded or collapsed position in which the handlebar assembly is folded down against the board for storage purposes. In one embodiment, the braking assembly includes a brake arm which is pivotally affixed to the base assembly and an extension arm which extends through an opening in the board. A foot pedal is located on the brake arm to allow the rider to push the brake arm down to actuate a brake pad which is attached to the extension arm. As the rider applies force to the brake pedal, the brake pad moves in frictional contact with the ground. A biasing means such as a tension spring maintains the brake arm and brake pad in an upward position until the brake is to be applied. A wheelie assembly also can be placed at the rear of the board to allow the rider to perform wheelies as a desired maneuver.

These and other advantages of the present invention will become more apparent from the following detailed description of the invention, when taken in conjunction with the accompanying exemplary drawings.

DETAILED DESCRIPTION OF THE PREFERRED EMBODIMENTS

Figure 1:
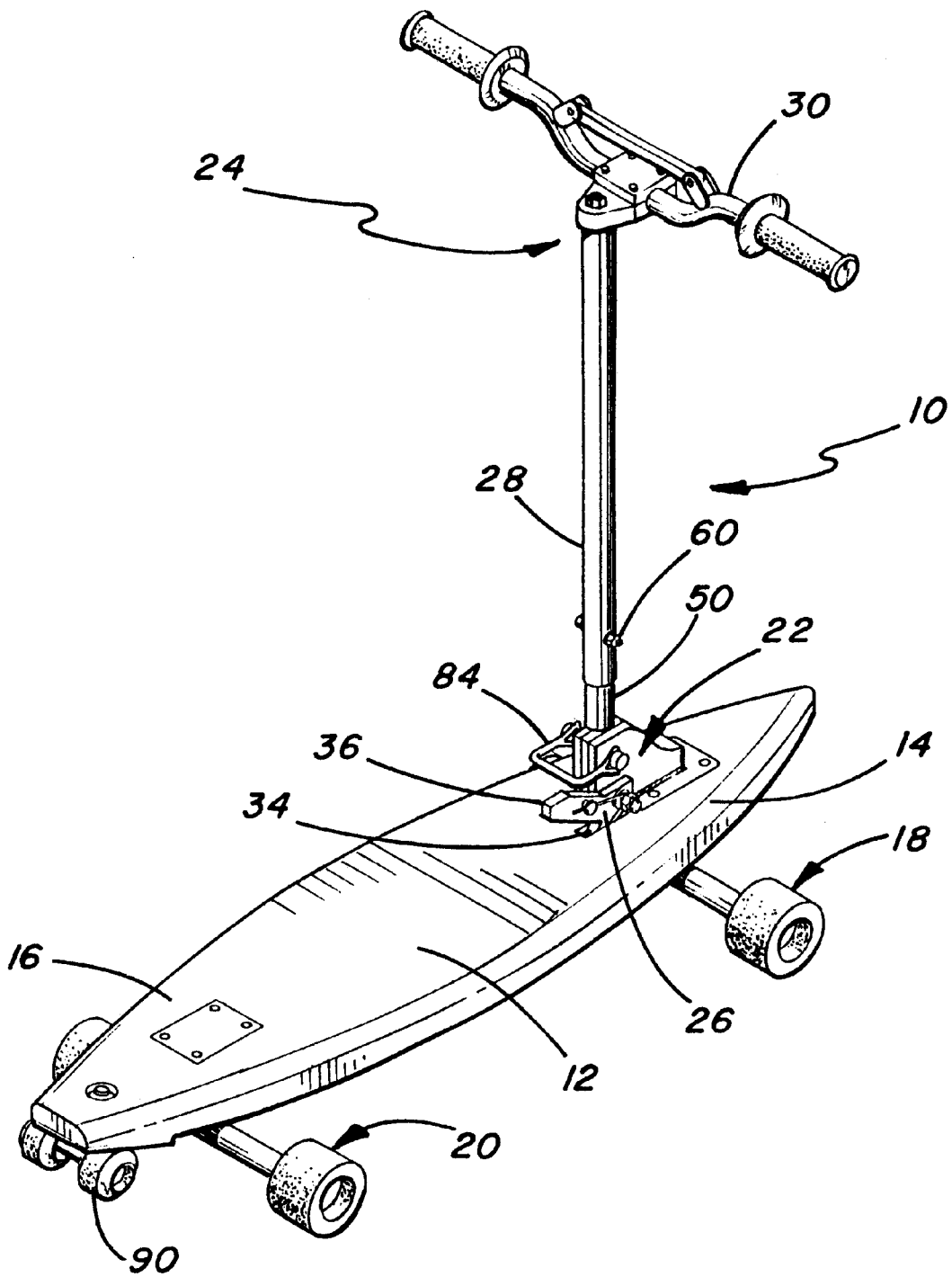
FIG. 1 is a perspective view of a recreational board vehicle embodying features of the present invention.

Turning now to the drawings, in which reference numerals represent like or corresponding elements in the drawings, FIG. 1 illustrates a recreational board vehicle 10 incorporating features of the present invention. In the particular embodiment shown in FIG. 1, the board vehicle 10 includes an elongated platform or board 12 having a forward section 14 and a rear section 16. The elongated board 12 supports the rider during use and can be formed in any number of different shapes, such as the surfboard-like shape as shown in FIG. 1. A front wheel truck assembly 18 is attached to the underside of the elongated board 12 at the forward section 14. A rear wheel truck assembly 20 is likewise attached to the underside of the board 12 at the rear section. The front and the rear wheel truck assemblies 18 and 20 include wheels and trucks. Any standard skateboard wheel assemblies could be used in accordance with the present invention. The wheels can be made from polyurethane or similar material. The base can be made from wood or a similar sturdy material.

A base assembly 22 is mounted near the forward section 14 of the board 12. A handlebar assembly 24 and a brake assembly 26 are mounted on the base assembly 22. The brake assembly 26 is shown in greater detail in FIGS. 2 and 3. The handlebar assembly 24 includes a shaft 28 and a set of handlebars 30 which allow the rider to better control and steer the board vehicle 10. As will be explained in greater detail below, the shaft 28 is adjustably attached to the base assembly 22 to allow the handlebars 30 to be set at varying heights above the board 12 to adjust for different heights of the riders who may be riding the board vehicle 10.

Figure 2:
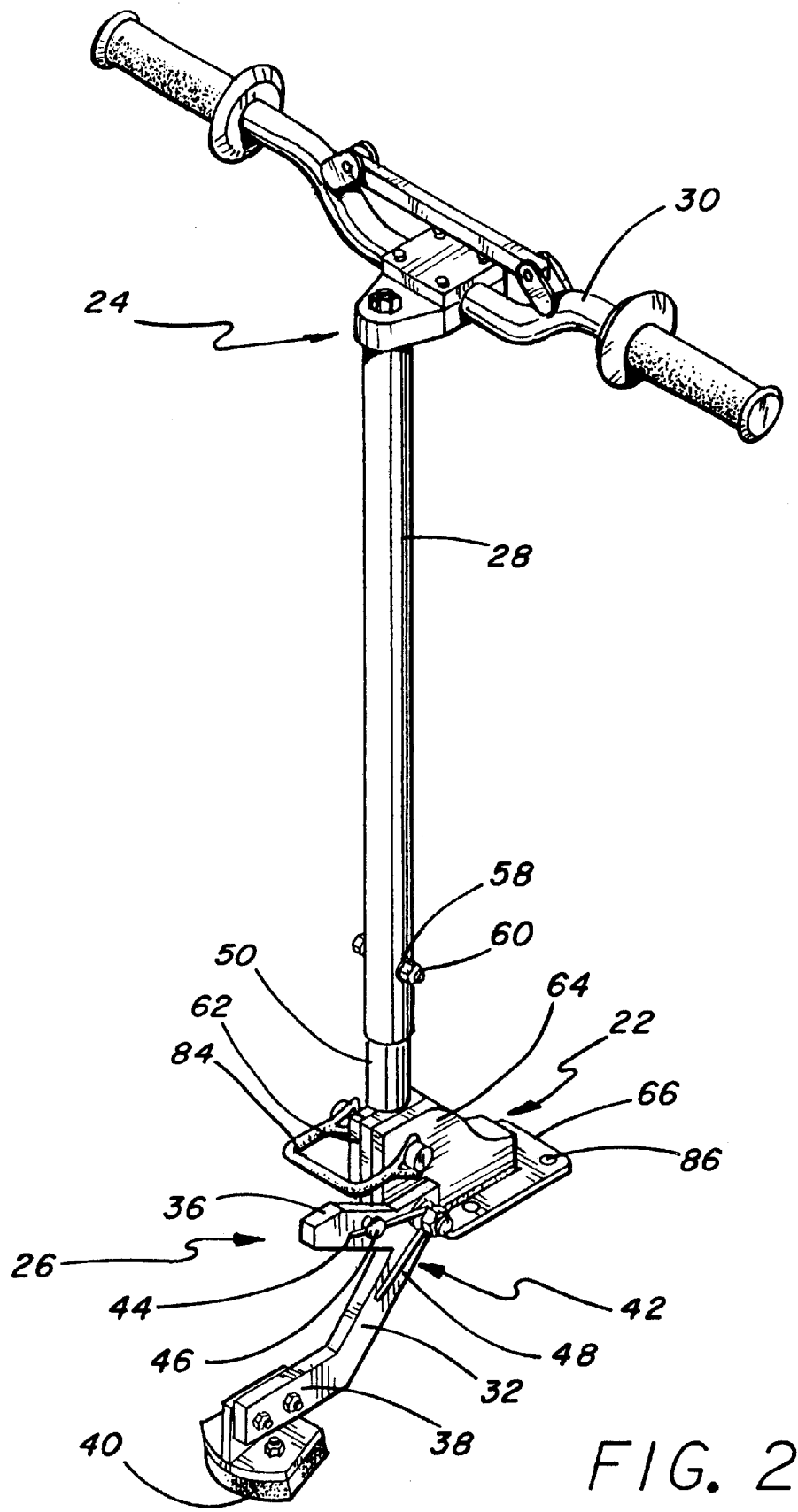
FIG. 2 is a perspective view of one embodiment of a base assembly, braking assembly, and handlebar assembly made in accordance with the present invention as is shown on the vehicle as depicted in FIG. 1.
Figure 3:
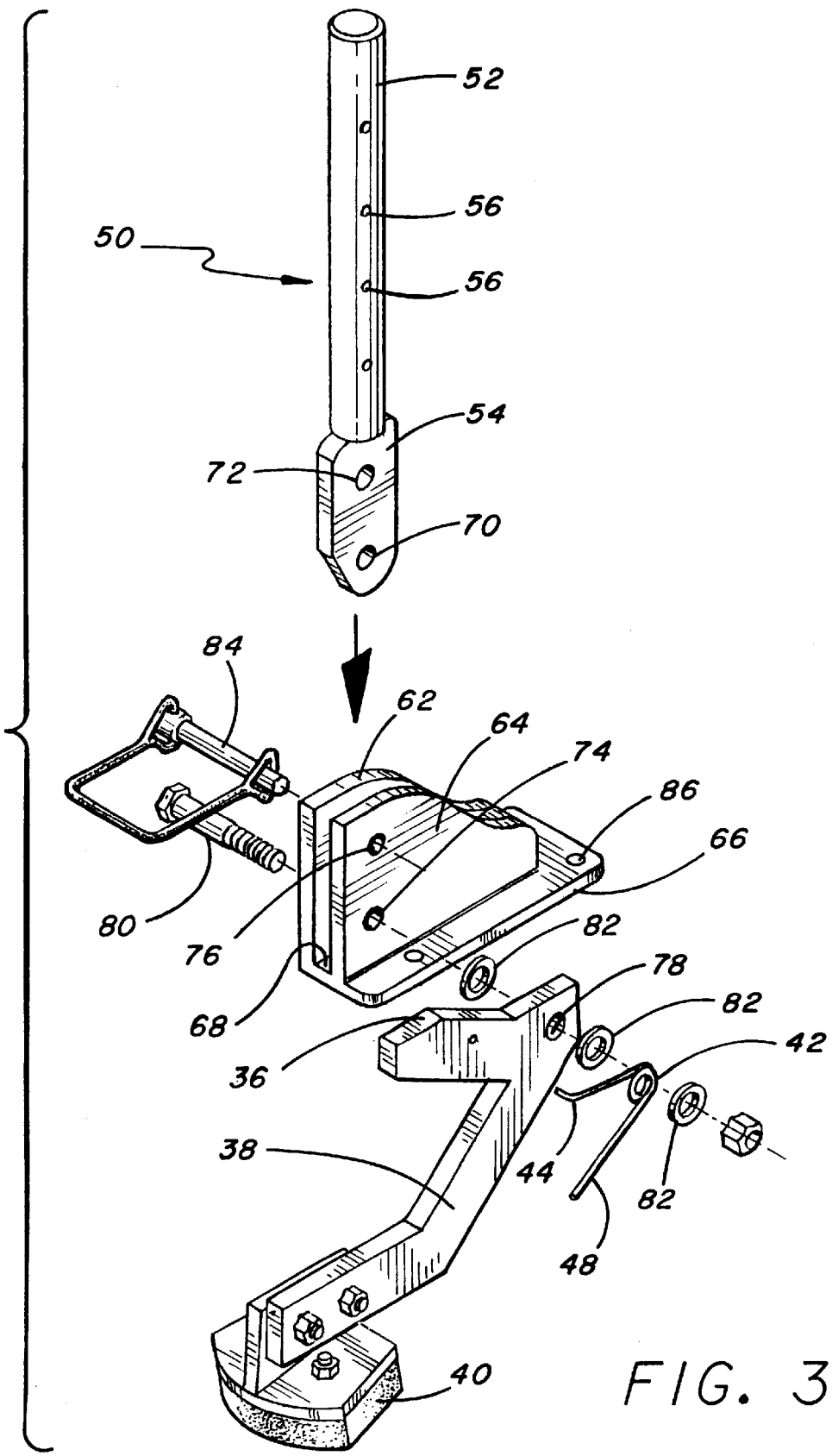
FIG. 3 is a exploded perspective view of the base assembly, brake assembly and a portion of the handlebar assembly shown in FIG. 2.

Referring specifically now to FIGS. 1–3, the brake assembly 26 is shown pivotally mounted to the base assembly 22 to allow for a smooth stop even at high speeds. The brake assembly 26 includes a brake arm 32 which extends through an opening 34 extending through the board 12. The brake arm 32 includes a foot pedal 36 which allows the rider to actuate the brake arm 32 for stopping purposes or to slow down the vehicle when performing a maneuver. The brake arm 32 also includes an extension arm 38 having a brake pad 40 mounted to it. In use, when the rider applies a direct force to the foot pedal 36, the brake arm 32 pivotally moves to cause the brake pad 40 to come in contact with the ground. The brake pad 40 can be made from materials such as rubber or any suitable durable material which will stop or slow down the vehicle 10 when brought in frictional contact with the ground. A tension spring 42 helps retract the brake pad 40 from the ground once the rider removes pressure on the foot pedal 36. The tension spring has one end 44 which extends into an opening of a set screw 46 located on the brake arm 32. The other end 48 of the tension spring 42 rests against the board or base assembly 22 to provide the necessary force to maintain the foot pedal 36 in an upward until the rider is to apply the brake. Once the rider releases his foot from the brake, the tension spring 42 retracts the brake arm 32 upward, lifting the brake pad 40 from the ground. Other suitable methods for attaching the brake assembly 26 to the base assembly 22 can be devised without departing from the spirit and scope of the present invention.

The shaft 28 of the handlebar assembly 24 shown in this particular embodiment of the invention is attached to a base mounting shaft 50 which forms part of the base assembly 22. The shaft 28 fits over the base mounting shaft 50 in a co-axial arrangement. As can be seen in FIG. 3, the base mounting shaft 50 includes a shaft portion 52 and a mounting plate 54. A number of openings 56 extend along the shaft portion 52. The handlebar shaft 28 also includes an opening 58 in which a fastener 60, such as a nut and bolt, can extend through along with one of the openings 54 located on the shaft portion 52 to set the particular height of the handlebars 30.

In the embodiment described herein, the base assembly 22 includes two upright plates 62 and 64 which form a bracket-like fixture for receiving the base mounting shaft 50 and the brake assembly 26. The plates 62 and 64 are connected to a base plate 66 which is mounted to the board 12. As can be seen in FIG. 3, the mounting plate 54 is designed to sit within a slotted opening 68 formed between the pair of plates 62 and 64. The mounting plate 54 also includes a first opening 70 and a second opening 72. The pair of mounting plates 62 and 64 include a first opening 74 and second opening 76 which align with the openings on the mounting plate 54. The brake arm 32 includes an opening 78 which aligns with the first opening 74 formed on the pair of mounting plates 62 and 64. When constructed, the mounting plate 54 is placed within the slotted opening 68 and a fastener 80, such as a nut and bolt assembly, is utilized to attach both the mounting portion 54 and brake arm 32 to the base assembly 22. The fastener 80 extends through the first opening 74 formed in the plates 62 and 64 and also extends through the first opening 70 on the base mounting plate. The fastener 80 also extends through the opening 78 on the brake arm 32 and receives the tension spring 42. Washers 82 can also be used when attaching the brake arm 32 to the mounting plates 62 and 64 to help allow the brake arm to freely pivot on the base assembly 22. A quick release fastener 84 extends through the second opening 76 of the plates 62 and 64 and the second opening 72 formed on the mounting plate 54 to maintain the shaft 28 in an upright position during use. This quick release fastener 84 can be removed to allow the entire handlebar assembly 24 to move to a collapsed position next to the board 12 for storage purposes. The shaft 28 also can be removed from the base mounting shaft 50 when in storage.

Figure 5:
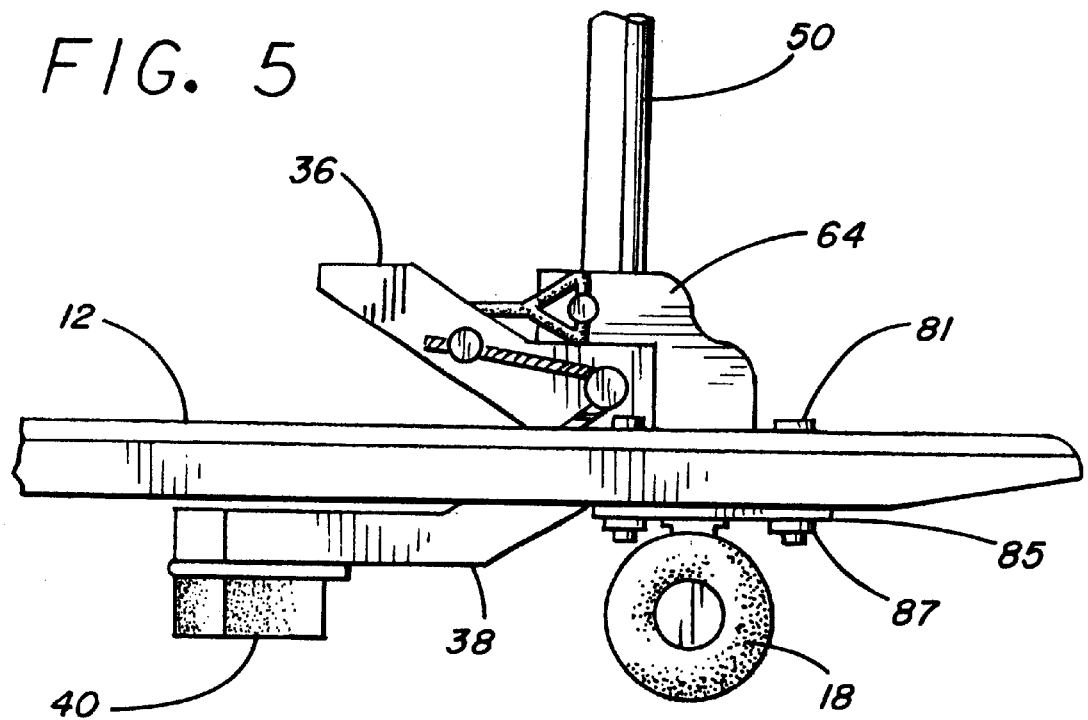
FIG. 5 is an elevational view of the base assembly, brake assembly and a portion of the handlebar assembly shown in FIG. 2 which shows the connection between the base assembly and the front wheel truck assembly.
Figure 6:
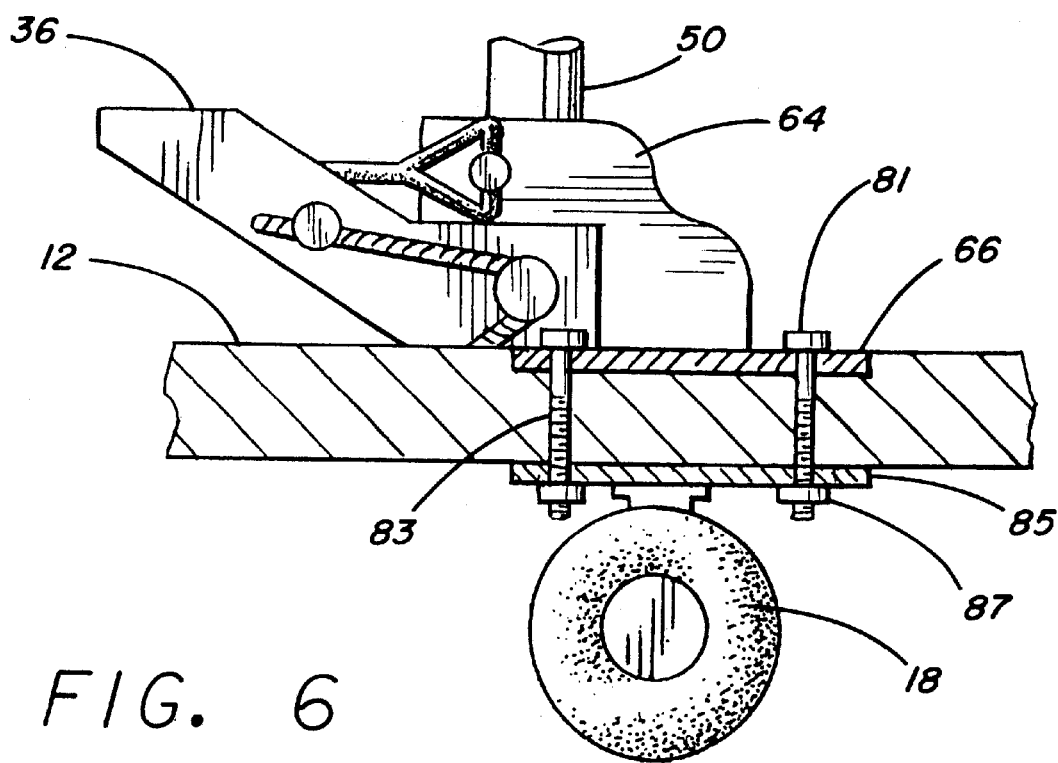
FIG. 6 is a cross sectional view of the base assembly and the front wheel truck assembly of FIG. 5.

The base plate 66 has a number of openings 86 which can be used to mount the base assembly 22 directly to the board 12. In one embodiment, the fasteners used to mount the base assembly 22 to the board can be directly connected to the front wheel truck assembly to provide a strong composite unit. Referring now to FIGS. 5 and 6, the base plate 66 is shown as it is attached to the front wheel truck assembly 18 and board 12 via fasteners, such as a simple nut and bolt combination. As can be seen in FIGS. 5 and 6, bolts 81 extend through the openings 86 of the base plate and openings 83 formed in the board 12. The front wheel truck assembly may include a plate 85 with openings which also receive the bolts 81. Nuts 87 are attached to the bolts 81 to maintain the base assembly and the front wheel truck assembly together, promoting a strong composite unit. It will be appreciated to those skilled in the art that still other ways of attaching the base assembly to the truck assembly can be accomplished without departing from the spirit and scope of the present invention.

Figure 4:
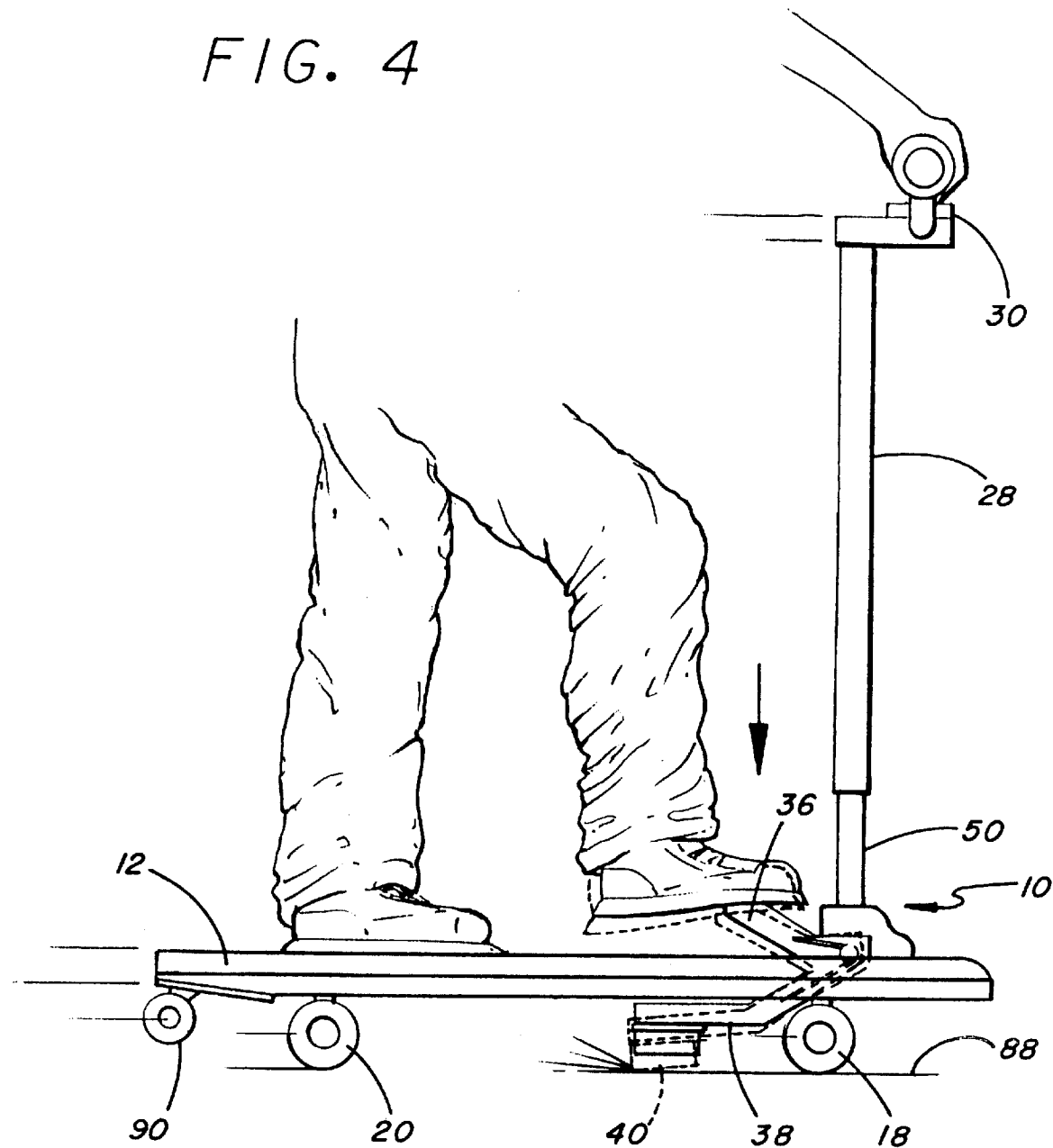
FIG. 4 is a elevational view showing a rider actuating the braking assembly made in accordance with the present invention while riding the recreational board vehicle.

Referring now to FIG. 4, when the rider of the board vehicle 10 intends to stop the vehicle, or slow down the vehicle, he merely steps on the foot pedal 36 to cause the brake pad 40 to come in frictional contact with the ground 88. As is shown in FIG. 4, the location of the brake assembly 26 directly on the same base assembly 22 used to mount the handlebar assembly 24 helps prevent the rider from being jarred either forward or backwards as the brake pad 40 comes in contact with the ground 88. This is due to the fact that much of the weight and center mass of the rider remains on the forward portion of the board where the brake assembly 26 is located. Also, due to the location of the base assembly 22 and brake assembly 26 in close proximity to the front wheel truck assembly 18, a much more smoother stop can be made with little or no forces which would cause the driver to fall off the vehicle or experience partial lost control of the vehicle. Placement of the brake assembly 26 on the base assembly 22 thus helps to prevent possible tipping or undesirable forces when the brake assembly 26 is actuated. The base assembly 22 provides a solid mounting structure for both the brake assembly and handlebar assembly.

The base assembly can be made from suitable materials, such as, but not limited to steel, aluminum, various raetalic alloys and some hard composite plastics and the like. The handlebar assembly could be made from similar materials well known in the art. The composite upright base plates and base plate could be cast as an integral unit or custom cut and welded. The manner of forming this base assembly could be made using other methods without departing from the spirit and scope of the present invention.

A wheelie assembly 90 could be placed at the rear end of the board 12 to allow the rider to perform wheelie maneuvers if desired. As with all skateboard-like vehicles, there are an endless number of maneuvers which can be accomplished by the rider by simply shifting his weight and position on the board. However, with the improved brake assembly and base assembly used in accordance with the present invention, smoother stops can be made by the rider while performing a multitude of maneuvers. Also, the solid wood board design may allow the rider to reach higher speeds than conventional foot operated scooters and skateboards.

In view of the foregoing, it is apparent that the present invention provides an improved system of mounting a handlebar assembly and brake assembly to a skateboard-like platform which enhances steering and braking performance, even at high speeds. Further modifications and improvements additionally made to the present invention disclosed herein without departing from the spirit and scope of the present invention. Accordingly, it is not intended that the invention be limited, except by the appended claims.

What is claimed is:

1. A recreational board vehicle, comprising:
   an elongated board having a forward section and a rear section for supporting a rider;
   a rear wheel truck assembly mounted to the underside of the elongated board at the rear section;
   a front wheel truck assembly mounted to the underside of the elongated board at the forward section;
   a base assembly mounted to the elongated board at the forward section;
   a brake assembly pivotally mounted to the base assembly for stopping the board vehicle, the brake assembly including a brake arm pivotally mounted to the base assembly having a foot pedal and an extension arm which extends through an opening in the elongated board, the extension arm having a brake pad attached thereto for contacting the ground when the brake pedal is actuated; and
   a handlebar assembly mounted to the base assembly which projects upward away from the elongated board to aid the rider in balancing and controlling the board vehicle.

2. The recreational board vehicle of claim 1, wherein:
   the front wheel truck assembly is mounted beneath the base assembly.

3. The recreational vehicle of claim 1, wherein:
   the brake assembly is located in close proximity to the front wheel truck assembly.

4. The recreational board vehicle of claim 1, wherein:
   the brake assembly further includes a biasing spring to maintain the foot pedal in a upward position to maintain the brake pad in a lifted position.

5. The recreational board vehicle of claim 1, wherein:

the base assembly includes a base mounting shaft and the handlebar assembly includes a shaft having one end attached to the base mounting shaft and a set of handlebars attached to the other end of the shaft.

6. The recreational board vehicle of claim 5, wherein the shaft can be moved to different locations on the base mounting shaft to vary the vertical position of the handlebars.

7. The recreational board vehicle of claim 5, wherein the base mounting shaft is moveable between an upright position and a collapsed position.

8. The recreational board vehicle of claim 5, wherein the base mounting shaft is pivotally attached to the base assembly to allow the base mounting shaft to move between an upright and collapsed position.

9. The recreational board vehicle of claim 5, wherein the base assembly includes a pair of substantially parallel upright plates forming a retaining bracket, the base mounting shaft being pivotally mounted between the pair of upright plates to allow the base mounting shaft to move between an upright position and a collapsed position, wherein the parallel upright plate and base mounting shaft include an opening for receiving a fastener for maintaining the base mounting shaft in an upright position.

10. The recreational board vehicle of claim 1, further including:

a wheelie truck assembly mounted to the underside of the elongated board.

11. The recreational board vehicle of claim 1, wherein:

the elongated board has the shape of a surfboard.

12. The recreational board vehicle of claim 11, wherein the elongated board is made from wood.

13. A recreational board vehicle, comprising:

an elongated board having a forward section and a rear section for supporting a rider;

a rear wheel truck assembly mounted to the underside of the elongated board at the rear section;

a front wheel truck assembly mounted to the underside of the elongated board at the forward section;

a base assembly mounted to the elongated board at the forward section, the base assembly including a pair of substantially parallel upright plates forming a retaining bracket and a base mounting shaft, the base mounting shaft being pivotally mounted between the pair of upright plates to allow the base mounting shaft to move between an upright position and a collapsed position;

a brake assembly pivotally mounted to the base assembly for stopping the board vehicle, the brake assembly a brake arm pivotally mounted to one of the upright plates and a foot pedal which extends above the surface of the board, an extension arm which extends through an opening in the board, and a brake pad attached to the extension arm which contacts the ground when the foot pedal is actuated; and a handlebar assembly mounted to the base assembly which projects upward away from the elongated board to aid the rider in balancing and controlling the board vehicle, the handlebar assembly including a shaft having one end attached to the base mounting shaft and a set of handlebars attached to the other end of the shaft.

14. A recreational board vehicle, comprising:

an elongated board having a forward section and a rear section for supporting a rider;

a rear wheel truck assembly mounted to the underside of the elongated board at the rear section;

a front wheel truck assembly mounted to the underside of the elongated board at the forward section;

a base assembly mounted to the elongated board at the forward section;

a brake assembly pivotally mounted to the base assembly for stopping the board vehicle including a brake arm pivotally mounted to the base assembly having a foot pedal and an extension arm which extends through an opening in the elongated board, the extension arm having a brake pad attached thereto for contacting the ground when the brake pedal is actuated; and a handlebar assembly mounted to the base assembly which projects upward away from the elongated board to aid the rider in balancing and controlling the board vehicle, wherein the front wheel truck assembly is mounted to the elongated board by fasteners which extend through the elongated board to mount the base assembly.

15. The recreational board vehicle of claim 14; wherein:

the brake assembly further includes a biasing spring to maintain the foot pedal in a upward position to maintain the brake pad in a lifted position.

* * * * *